Nov. 25, 1930.   J. W. WOODRUFF   1,782,704
OIL MEASURING APPARATUS
Filed March 27, 1928   2 Sheets-Sheet 1
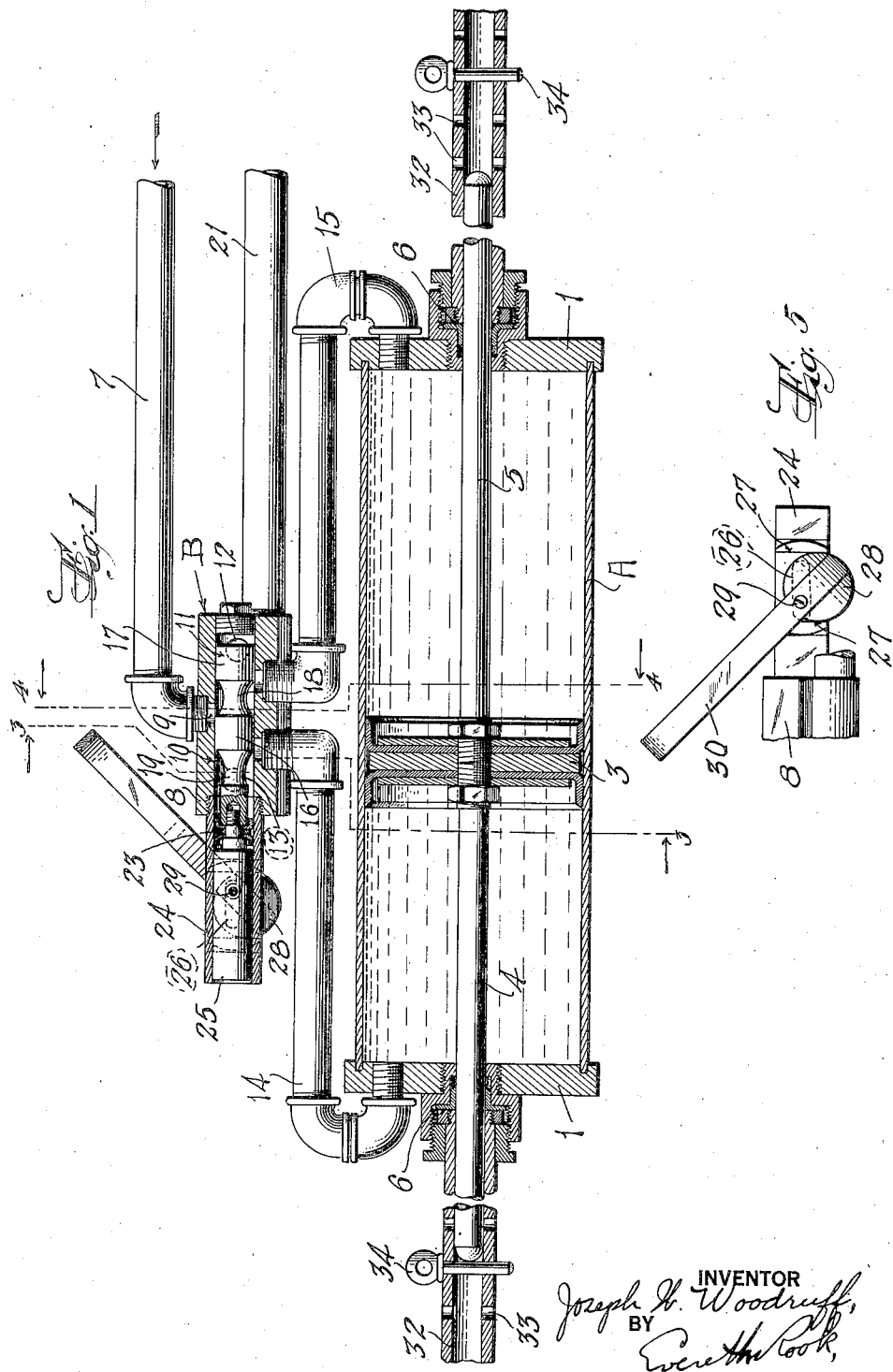
INVENTOR
Joseph W. Woodruff,
BY
Everett Cook,
ATTORNEYS.

Nov. 25, 1930.  J. W. WOODRUFF  1,782,704
OIL MEASURING APPARATUS
Filed March 27, 1928    2 Sheets-Sheet 2
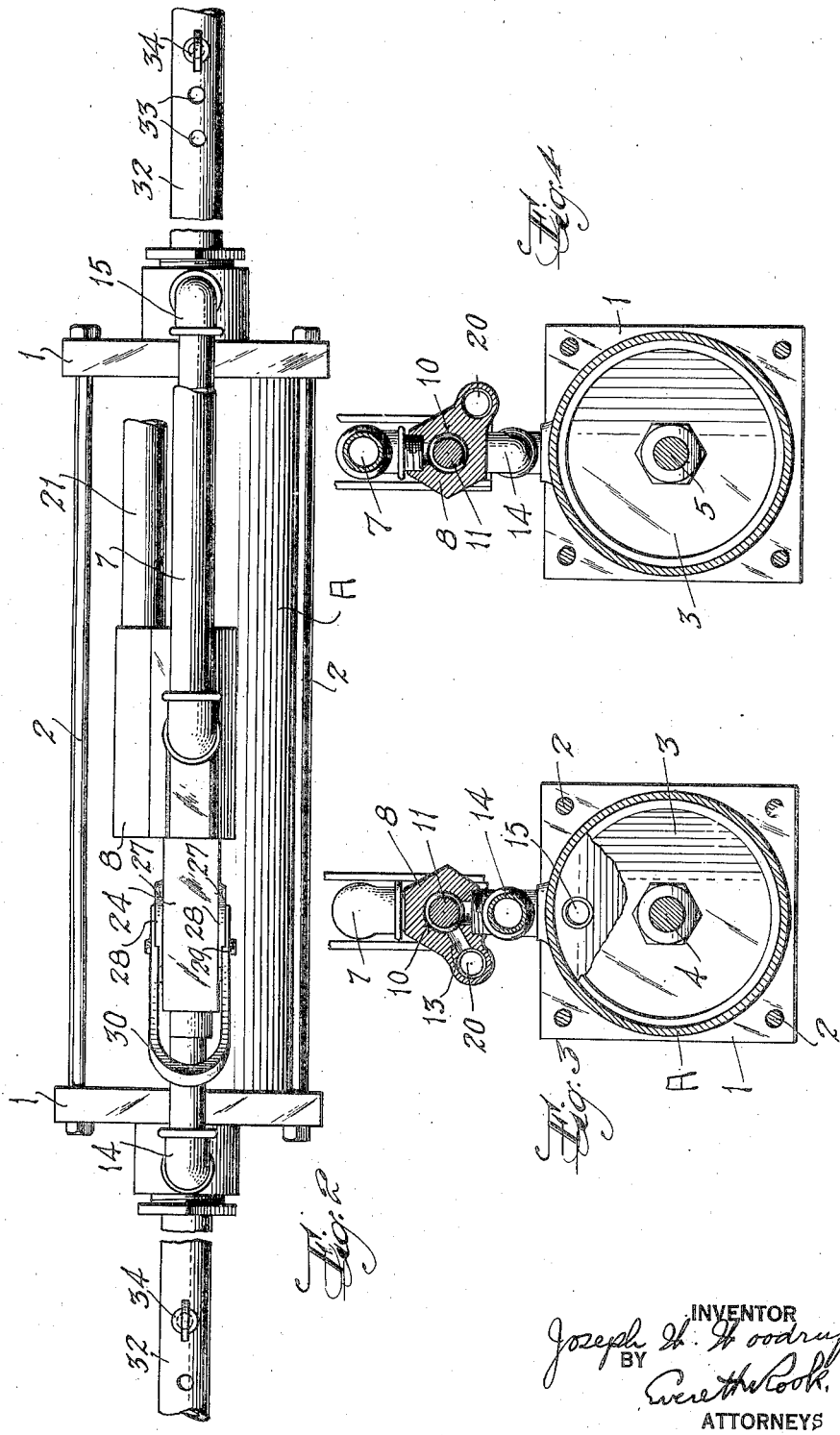
INVENTOR
Joseph W. Woodruff,
BY
Everett Rook,
ATTORNEYS Patented Nov. 25, 1930

1,782,704

UNITED STATES PATENT OFFICE

JOSEPH W. WOODRUFF, OF ELIZABETH, NEW JERSEY

OIL-MEASURING APPARATUS

Application filed March 27, 1928. Serial No. 265,129.

This invention relates in general to apparatus for measuring liquid or semi-liquid materials, for example oil or grease, and more particularly the invention contemplates improvement in a combination measuring and pumping apparatus whereby the material may be ejected from the measuring apparatus at high pressure.

One object of the invention is to provide novel and improved apparatus of the character described comprising two measuring chambers alternately connected to a supply of material under pressure so that the material is ejected from one chamber by and simultaneously with the flow of material into the other chamber, whereby measured quantities can be rapidly and efficiently supplied without auxiliary pumping apparatus to force the material through the measuring chambers.

Other objects are to provide such apparatus embodying novel and improved features of construction whereby the measured quantities may be varied as desired; to provide pumping and measuring apparatus of this character comprising a cylinder having a pipe at each end for supplying and discharging material and a piston movable between said ends and dividing said cylinder into two chambers the capacity of which is dependent upon the position of said piston, with novel and improved valve means being provided for simultaneously supplying material from a source under pressure through one of said pipes to one end of said cylinder and permitting discharge of material from the other end of said cylinder, the pressure of the incoming material on said piston serving to move the piston to forcibly eject the outgoing material; to provide means for variably limiting movement of said piston in both directions; to provide novel and improved valve mechanism, and to obtain other advantages and results as will be brought out by the following description.

Referring to the accompanying drawings, in which corresponding and like parts are designated throughout the several views by the same reference characters, Figure 1 is a vertical longitudinal sectional view through an oil measuring apparatus embodying my invention;

Figure 2 is a top plan view thereof;

Figure 3 is a transverse vertical sectional view, taken on the line 3—3 of Figure 1;

Figure 4 is a similar view, taken on the line 4—4 of Figure 1, and

Figure 5 is a side elevation of the valve actuating mechanism.

Specifically describing the illustrated embodiment of the invention, the reference character A designates the measuring and pumping cylinder which has heads 1 at its opposite ends connected together by tie bolts or the like 2. Arranged for longitudinal movement in the cylinder from one end thereof to the other, is a piston 3 having a piston rod, portions 4 and 5 of which project from opposite sides of the piston and through the respective heads 1, packing glands 6 being provided in the cylinder heads around the piston rod portions 4 and 5. The piston 3 thus divides the cylinder A into two measuring chambers, one between each side of the piston and the corresponding cylinder head 1, and obviously the capacity of the respective chambers is dependent upon the position of the piston 3 in the cylinder.

The oil or grease or other material to be measured is supplied to the measuring cylinder A through a pipe 7 from any suitable source under pressure, and passage of the material to and from the measuring cylinder is controlled by a valve mechanism B having a casing 8 formed with an inlet 9 communicating with a longitudinal valve chamber 10 in which is reciprocable a double piston valve 11 which controls communication between the inlet 9 and ports 12 and 13, one of which is connected through the valve chamber 10 by a pipe 14 to one end of the cylinder A and the other of which is connected by a pipe 15 to the other end of the cylinder A. The stop portions 16 and 17 of the piston valve 11 are of a size and so related that in neutral position of the valve they close communication between the valve chamber 10 and the pipes 14 and 15, and the valve 11 is formed between the stop portions 16 and 17 with a reduced neck 18 and at one end with a corresponding reduced neck 19, so that when the valve 11 is at one side or the other of its neutral position material may flow from the pipe 7 through the valve chamber 10 and into one of the pipes 14 or 15, and may flow from the other pipe 14 or 15 through the valve chamber 10 to the corresponding port 12 or 13. These ports 12 and 13 are connected to a common discharge passage 20 to which is connected an outlet pipe 21 for conducting the material to any suitable point.

The valve 11 may be reciprocated in any suitable manner, but preferably has at one end thereof a packing 23 slidable within an extension cylinder 24 at one end of the valve chamber 10, in which is also slidable an actuating block 25. The sides of the extension cylinder 24 have openings 26 and a pair of spaced abutments or shoulders 27 at each side of the cylinder. A cam 28 is arranged between each pair of abutments 27 and is eccentrically connected by a screw 29 to the valve actuating block 25. The cams are rotated by a suitable handle 30 connected thereto by the respective screws 29. With this construction it will be observed that swinging of the handle 30 will cause longitudinal movement of the valve 11 in the valve chamber 10, the valve being in neutral position when the handle is substantially vertical, and being in the opposite open positions when the handle is at either side of the vertical.

In operation of the apparatus, the material is admitted to one end of the cylinder A through the valve B, the piston is moved toward the other end of the cylinder under pressure of the incoming material, and simultaneously the material in the second mentioned end of the cylinder is forced outwardly from the cylinder by the piston. Obviously the amount of material admitted to and the amount of material ejected from the cylinder A is directly dependent upon the extent of movement of the piston 3. When the position of the valve 11 is reversed, the material is admitted from the pipe 7 into the second-mentioned end of the cylinder, and previously admitted material in the first-mentioned end of the cylinder will be ejected.

For varying the amount of movement of the piston and thereby varying the amount of material ejected from the cylinder, I may provide tubes 32, one at each end of the cylinder and loosely surrounding the corresponding portion 4 or 5 of the piston rod. These tubes are provided with transverse openings 33 which are adapted to removably receive stop pins 34. It will be understood that these stop pins will serve to limit the movement of the piston 3, as clearly shown in Figure 1 of the drawing, greater or less movement of the piston being permitted accordingly as the respective pin is moved further from or nearer to the respective cylinder head.

From the foregoing it will be observed that measured quantities of the material may be rapidly and efficiently supplied without auxiliary pumping apparatus in the measuring mechanism, and the quantities of material may be easily varied at will.

While I have shown and described the preferred embodiment of my invention, it will be understood that this is primarily for the purpose of illustrating the principles thereof and that many modifications and changes may be made in the details of construction without departing from the spirit and scope of the invention. The valve B may be manually actuated as described or automatically in any suitable manner, and other suitable stop means may be utilized for limiting movement of the piston 3.

Having thus described the invention, what I claim is:

1. Fluid dispensing apparatus comprising a measuring cylinder, a piston therein, a supply pipe for material under pressure to be measured, a valve mechanism including a casing having an inlet connected to said supply pipe and communicating with a valve cylinder having an open end and four ports leading from said valve cylinder, means for establishing communication between each of two of said ports and one end of said measuring cylinder, a reciprocable piston valve in said valve cylinder having two spaced stop portions with a reduced neck therebetween and another reduced portion at one end of one stop portion for simultaneously controlling communication between said inlet and one of the first-mentioned two ports and between the other of the first-mentioned two ports and one of the other two ports, packing means at the end of said valve beyond the last-mentioned reduced portion, and means connected to said end of the valve for reciprocating the valve.

2. Fluid dispensing apparatus comprising a measuring cylinder, a piston therein, a supply pipe for material under pressure to be measured, a valve mechanism including a casing having an inlet connected to said supply pipe and communicating with a valve cylinder having two adjacent ports intermediate the ends thereof and two other ports one between each of the first-mentioned two ports and the corresponding end of the valve cylinder, means establishing communication between each of two of said ports and one end of said measuring cylinder, and a reciprocable valve piston in said valve cylinder having two spaced stop portions with a reduced neck therebetween and another reduced portion at one end of one stop portion for simultaneously controlling communication between said inlet and one of the first-mentioned two ports and between the other of the first-mentioned two ports and one of the second-mentioned ports.

3. Valve mechanism comprising a casing having a cylinder provided with an inlet and two adjacent ports intermediate the ends thereof and two outlet ports one between each of the first-mentioned two ports and the corresponding end of the valve cylinder, a reciprocable piston valve in said valve cylinder having two spaced stop portions with a reduced neck therebetween and another reduced portion at one end of one stop portion for simultaneously controlling communication between said inlet and one of the first-mentioned two ports and between the other of the first-mentioned two ports and one of the second mentioned ports, packing means at the end of said valve beyond the last-mentioned reduced portion, said casing having a longitudinal slot outwardly beyond said packing means and two exterior opposed abutments one at each end of said slot, a circular disk arranged between and with its periphery bearing upon said abutments, means passing through said slot for eccentrically rotatably connecting said disk to said valve piston, and means for rotating said disk for reciprocating said valve.

JOSEPH W. WOODRUFF.